US007330547B2

United States Patent
Turcanu

(10) Patent No.: US 7,330,547 B2
(45) Date of Patent: Feb. 12, 2008

(54) DUAL KEYPAD PHONE

(75) Inventor: Calin Turcanu, Helsinki (FI)

(73) Assignee: Nokia Corporation, Espoo (FI)

( * ) Notice: Subject to any disclaimer, the term of this patent is extended or adjusted under 35 U.S.C. 154(b) by 709 days.

(21) Appl. No.: 10/787,684

(22) Filed: Feb. 26, 2004

(65) Prior Publication Data

US 2005/0195971 A1    Sep. 8, 2005

(51) Int. Cl.
*H04M 1/00* (2006.01)
*H04M 9/00* (2006.01)

(52) U.S. Cl. .......................... 379/433.07; 379/433.01; 379/433.11; 379/433.12; 379/434; 455/575.3; 455/556.1; 455/90.3

(58) Field of Classification Search ........... 379/433.07, 379/433.01, 433.11, 433.12, 434; 455/575.3, 455/556.1, 90.1
See application file for complete search history.

(56) References Cited

U.S. PATENT DOCUMENTS 6,549,789 B1 * 4/2003 Kfoury .................... 455/550.1
7,010,834 B2 * 3/2006 Barnett ....................... 16/367
7,136,687 B2 * 11/2006 Chang .................... 455/575.3

* cited by examiner

*Primary Examiner*—Curtis Kuntz
*Assistant Examiner*—Phylesha Dabney
(74) *Attorney, Agent, or Firm*—Perman & Green, LLP

(57) ABSTRACT

A telephone comprises a first body part with a first keypad and a second keypad located on opposite sides of the first body part, and a second body part having a display. As the first body part is swiveled to bring the second keypad to the front of the phone the processing circuitry may switch over to only accept input from the keypad that has been brought up. This input is used to control the applications currently running.

6 Claims, 1 Drawing Sheet

DUAL KEYPAD PHONE

FIELD OF THE INVENTION

The present invention relates to a telephone comprising two keypads.

BACKGROUND

Communication devices have during the last decades evolved from being more or less primitive telephones, capable of conveying only narrow band analog signals such as voice conversations, into the multimedia mobile devices of today capable of processing large amounts of data representing any kind of data, including text data, as well as very complex multi media content and game data.

While the processing capability of these devices has increased, their physical sizes are typically very small. A problem related to such devices is then how to enable a user to conveniently input data via keys on a keypad to the processing circuitry of the device. For example, a typical telephone keypad comprises 12 keys arranged in a 3 by 4 matrix configuration, each key having a plurality of functions depending on which processing is performed. Such a keypad configuration is adequate for most purposes relating to telephone applications, such as dialing a telephone number and typing short text messages, but not adequate enough when a user desires to perform more complex typing operations, such as inputting long texts or controlling a game.

In the prior art, there are a number of different solutions to problems relating to keypad input in telephone devices. Among these are devices having a first keypad, having the typical 3 by 4 matrix configuration, sometimes located partly in front of a display and configured to be tilted away revealing a larger part of the display on which a second, virtual, keypad is presented.

One example of a dual keypad telephone is the Nokia 9110 communicator. The 9110-device comprises a main body having one large keypad and a so-called flip lid with a small keypad together with a small display on one side and a large display on the opposite side of the lid. In a first configuration, the lid is in a closed position, covering the main body keypad, and the phone is controlled by means of the small lid keypad. The lid can be tilted away from the main body, thereby placing the device in a second configuration where the main body keypad is revealed as well as the large display of the lid.

Another example in the prior art is that of the Nokia model 6800 mobile telephone. The 6800-device comprises a main body having one keypad and a so-called flip lid with two keypads on opposite sides of the lid. In a first configuration, the lid is in a closed position, covering the main body keypad, and the phone is controlled by means of one of the lid keypads. The lid can be tilted away from the main body, thereby placing the device in a second configuration where the second lid keypad is revealed as well as the main body keypad. In the second configuration, the display is interspaced between the main body keypad and the lid keypad.

SUMMARY OF THE INVENTION

In view of drawbacks related to communication devices according to prior art, it is an object of the present invention to provide improved input capability of a telephone.

The object is achieved in a first aspect by way of a telephone according to claim 1.

A telephone according to the invention hence comprises a display, a first keypad, a second keypad and processing and communication circuitry. The first and second keypads are located on opposite sides of a first body part of the telephone and the display is located in a second body part of the telephone. The first and second body parts are electrically and mechanically joined via a swivel hinge, which is configured to allow movement of the first and second body parts between at least a first and a second position relative to each other. The first relative position is such that said first keypad is facing in a first direction and the second keypad is facing in a second direction substantially different from the first direction and the display is facing substantially in the first direction. The second relative position is such that the second keypad is facing in the first direction, the first keypad is facing in the second direction and the display is facing substantially in the first direction.

In a preferred embodiment, the hinge is further configured to actuate electric switching means connected to the circuitry in the telephone when allowing movement of the body parts between the first and second position relative to each other, and the processing and communication circuitry is configured to detect the actuation of the electric switching means.

As the first body part is swiveled to bring the second keypad to the front of the phone the processing circuitry may switch over to only accept input from the keypad that has been brought up. This input is used to control the applications currently running.

Alternatively, the processing and communication circuitry may be arranged to accept input from both first and second keypads while the body parts are in the second relative position. Such an arrangement may advantageously be used when operating the device during, e.g., game control when a user manipulates keys on both keypads simultaneously.

Preferably only a subset of the first keypad is activated and only during the execution of a dedicated application.

Possibly the controller could be programmed to initiate certain tasks depending on which keypad is set to be active. For instance if a game keypad is currently on the backside is swiveled to become active, the game last played would automatically be started or, if the game keypad is dedicated to one particular game., that game would be started. Or if a clavier type keypad were to be used, the musical application would be started.

An effect of the invention is hence that it provides the possibility of having dedicated keypads, possibly comprising only a few keys, a joystick or a clavier, for different types of applications, examples of which include games and utility applications. This is advantageous in that it provides a user of a telephone with a much improved input capability when compared to prior art devices.

DETAILED DESCRIPTION OF PREFERRED EMBODIMENTS

Figures 1A, 1B, 1C:
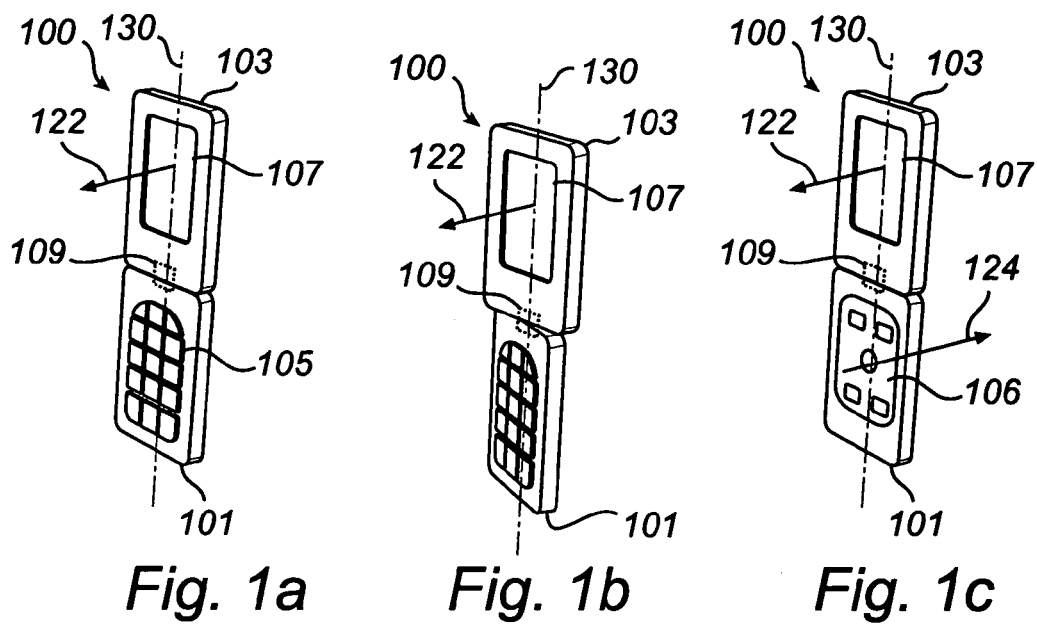
FIGS. 1a-1c are schematically drawn perspective views of a telephone according to the present invention.

FIGS. 1a, 1b and 1c are three different perspective views of a telephone 100 according to the present invention. The view in FIGS. 1a-c shows the telephone 100 with a first body part 101 and a second body part 103. The first body part 101 comprises a first keypad 105 and a second keypad 106. The second body part 103 comprises a display 107. A swivel hinge 109 connects the two body parts 101, 103 together and in FIG. 1a the two body parts 101, 103 are in a first position relative to each other where the first keypad 105 is facing substantially in the same direction 122 as the display 107. A swivel axis 130, around which the first 101 and second 103 body parts can swivel with respect to each other, is also indicated in FIGS. 1a-c. The situation illustrated in FIG. 1a is one during which a user of the telephone 100 may manipulate and input information via the first keypad 105, e.g. dialing in order to place a telephone call, while at the same time viewing output information on the display 107.

The view in FIG. 1b shows the two body parts 101, 103 in a position relative to each other, which is different from the relative position shown in FIG. 1a. The first body part 101, with its first keypad 105, is in FIG. 1b slightly swiveled around the swivel axis 130. Thereby, FIG. 1b illustrates a transition from the first relative position between the body parts 101, 103 to a second relative position. The situation illustrated in FIG. 1b is one during which a user of the telephone 100 typically refrains from using the keypads.

The view in FIG. 1c shows the two body parts 101, 103 in a position relative to each other, which is different from the relative positions shown in FIGS. 1a and 1b. The second body part 103, with its display 107, is in FIG. 1c swiveled around the swivel axis 130 and the angle of swivel around swivel axis 130 is substantially different from the situation shown in FIG. 1a and is substantially 180 degrees. Thereby, FIG. 1c illustrates a second relative position between the body parts 101, 103. The display 107 faces in the first direction 122 while the first keypad faces substantially in a second direction 124. The situation illustrated in FIG. 1c is one during which a user of the telephone 100 may use second keypad 106 to play a game etc., while at the same time viewing output information on the display 107.

Figure 2:
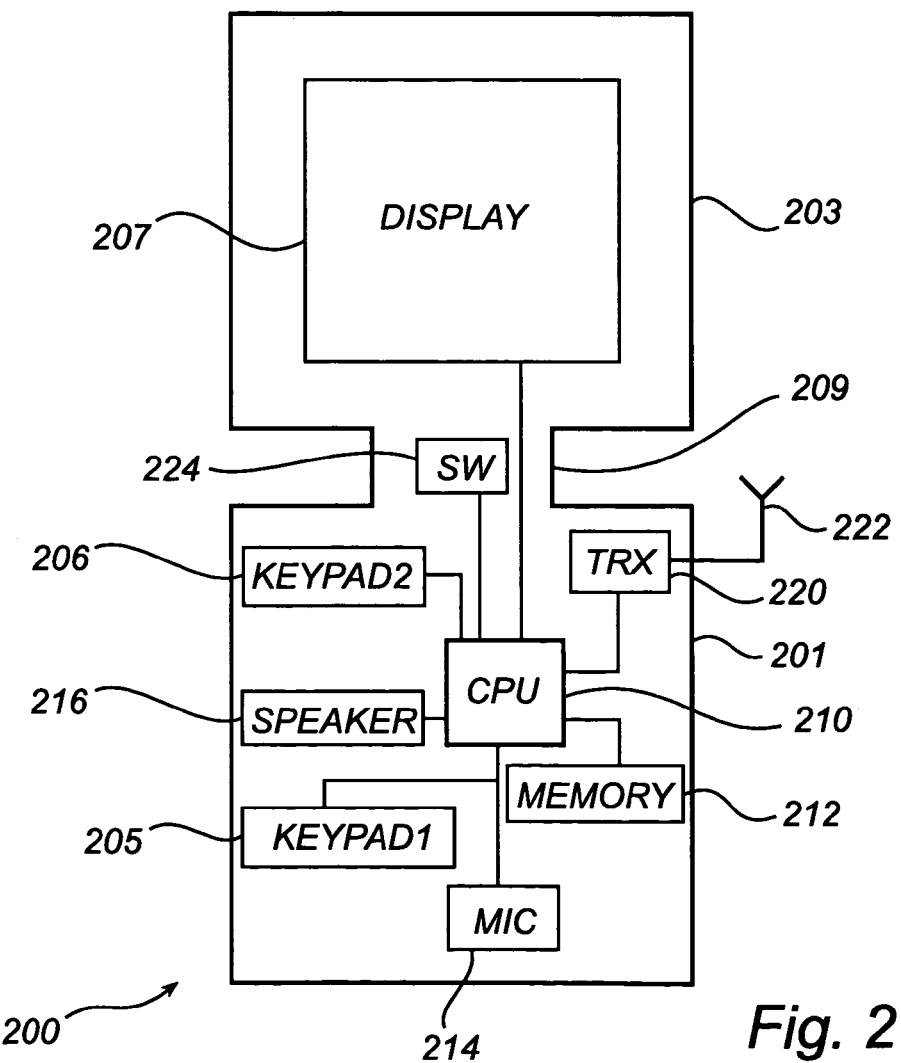
FIG. 2 is a functional block diagram of a telephone according to the present invention.

FIG. 2 shows a block diagram of a telephone 200 according to the present invention. A first body part 201 comprises a processing unit 210 connected to an antenna 222 via a transceiver 220, a memory unit 212, a microphone 214, a first keypad 205, a second keypad 206 and a speaker 216. The processing unit 210 is also connected to a display 207, which is comprised in a second body part 203 of the telephone 200.

No detailed description will be presented regarding the specific functions of the different blocks of the telephone 200. In short, however, as the person skilled in the art will realize, the processing unit 210 controls the overall function of the functional blocks in that it is capable of receiving input from the keypads 205, 206, audio information via the microphone 214 and receive suitably encoded and modulated data via the antenna 222 and transceiver 220. The processing unit 210 is also capable of providing output in the form of sound via the speaker 216, images via the display 207 and suitably encoded and modulated data via the transceiver 220 and antenna 222.

The second body part 203 is mechanically connected to the first body part 201 via a swivel hinge 209. The display 207 is electrically connected to the processing unit 210 via electric connection means (not shown in FIG. 2) comprised in the hinge 209. The hinge 209 is configured, when it allows relative movement of the two body parts 201, 203, to actuate an electric switch 224. The switch 224 is connected to the processing unit 210 and is thereby capable of conveying information regarding the relative position of the two body parts 201, 203 to the processing unit 210.

It is to be noted that the different blocks that have been described above are functional blocks and do not necessarily correspond to actual hardware units in a one-to-one relationship. As the skilled person will realize, functionality comprised in the blocks of FIG. 2 may, wholly or in part, be comprised in one or more integrated circuits in the form of any mixture of programmable and non-programmable circuits.

The invention claimed is:

1. A telephone comprising a display, a first keypad, a second keypad and processing and communication circuitry, where:
   said first and second keypads are located on opposite sides of a first body part of the telephone and said display is located in a second body part of the telephone,
   said first and second body parts are electrically and mechanically joined via a swivel hinge,
   said hinge is configured to allow movement of said first and second body parts between at least a first and a second position relative to each other,
   said first relative position is such that said first keypad is facing in a first direction, said second keypad is facing in a second direction substantially different from said first direction and the display is facing substantially in said first direction,
   said second relative position is such that said second keypad is facing in said first direction, said first keypad is facing in said second direction and the display is facing substantially in said first direction.

2. A telephone according to claim 1, where said hinge is further configured to actuate electric switching means connected to the circuitry in the telephone when allowing movement of the body parts between said first and second position relative to each other, and
   said processing and communication circuitry is configured to detect said actuation of said electric switching means.

3. A telephone according to claim 1 in which said processing and communication circuitry is arranged to accept input from said first keypad while said body parts are in the first relative position, and in which said processing and communication circuitry is arranged not to receive input from said second keypad while said body parts are in the first relative position.

4. A telephone according to claim 1 in which said processing and communication circuitry is arranged to accept input from said second keypad while said body parts are in the second relative position, and in which said processing and communication circuitry is arranged not to receive input from said first keypad while said body parts are in the second relative position.

5. A telephone according to claim 1, in which said processing and communication circuitry is arranged to accept input from said first keypad and said second keypad while said body parts are in the second relative position.

6. A telephone according to claim 1, in which said processing and communication circuitry is arranged not to receive input from any of the first and second keypad when said first and second body parts are in a position relative to each other, which is different from said first relative position and different from said second relative position.

* * * * *